United States Patent
Bailey, Jr. et al.

(10) Patent No.: US 10,338,090 B2
(45) Date of Patent: Jul. 2, 2019

(54) AIRSPEED ESTIMATION SYSTEM

(71) Applicant: Sikorsky Aircraft Corporation, Stratford, CT (US)

(72) Inventors: Dale R. Bailey, Jr., Woodbridge, CT (US); Antonio Rivera, East Berlin, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 110 days.

(21) Appl. No.: 15/508,413

(22) PCT Filed: Sep. 4, 2015

(86) PCT No.: PCT/US2015/048503
§ 371 (c)(1),
(2) Date: Mar. 2, 2017

(87) PCT Pub. No.: WO2016/037035
PCT Pub. Date: Mar. 10, 2016

(65) Prior Publication Data
US 2017/0307646 A1 Oct. 26, 2017

Related U.S. Application Data

(60) Provisional application No. 62/045,704, filed on Sep. 4, 2014.

(51) Int. Cl.
*G01P 5/00* (2006.01)
*G01P 7/00* (2006.01)
(Continued)

(52) U.S. Cl.
CPC .............. *G01P 5/00* (2013.01); *B64C 13/503* (2013.01); *B64D 43/02* (2013.01); *G01P 5/02* (2013.01); *G01P 7/00* (2013.01); *G01P 15/00* (2013.01)

(58) Field of Classification Search
CPC .... G01P 5/00; G01P 5/02; G01P 15/00; G01P 7/00; B64C 13/503; B64D 43/02
(Continued)

(56) References Cited

U.S. PATENT DOCUMENTS 4,382,283 A * 5/1983 Clelford ................... G01P 5/16
244/17.13
4,797,674 A * 1/1989 Zweifel ................ G05D 1/0623
244/181
(Continued)

OTHER PUBLICATIONS

ISR/WO, dated Dec. 4, 2015, PCT application No. PCT/US15/48503, 12 pages.
(Continued)

*Primary Examiner* — Sujoy K Kundu
*Assistant Examiner* — Lynda Dinh
(74) *Attorney, Agent, or Firm* — Cantor Colburn LLP

(57) ABSTRACT

An airspeed estimation system of an aircraft includes an electronic airspeed rate modeler unit configured to output an estimated airspeed rate signal indicating an estimated airspeed rate of the aircraft. The estimated airspeed rate signal is based on a longitudinal body acceleration of the aircraft and at least one adaptive parametric airspeed model. The airspeed estimation system further includes an electronic airspeed estimator unit in signal communication with the airspeed rate modeler unit. The airspeed estimator unit is configured to determine an estimated airspeed of the aircraft based on the estimated airspeed rate signal.

10 Claims, 2 Drawing Sheets

(51) Int. Cl.
  *G01P 15/00* (2006.01)
  *G01P 5/02* (2006.01)
  *B64C 13/50* (2006.01)
  *B64D 43/02* (2006.01)

(58) Field of Classification Search
  USPC .......................................................... 702/144
  See application file for complete search history.

(56) References Cited

U.S. PATENT DOCUMENTS

| | | | | |
|---|---|---|---|---|
| 5,349,347 | A | * | 9/1994 | Muller .................... G01C 5/005 340/969 |
| 7,970,501 | B2 | * | 6/2011 | Kirkland .............. G01C 21/165 340/969 |
| 2008/0308681 | A1 | | 12/2008 | Wilson et al. |
| 2011/0184592 | A1 | * | 7/2011 | Elias ...................... G01C 23/00 701/7 |
| 2012/0179304 | A1 | | 7/2012 | Tokumochi |
| 2013/0035809 | A1 | * | 2/2013 | Ezerzere .............. G05D 1/0055 701/7 |
| 2013/0066488 | A1 | * | 3/2013 | Walter ................... B64D 43/02 701/14 |

OTHER PUBLICATIONS

Scott A. McLaren, Major, USAF. "Velocity Estimate Following Air Data System Failure" Thesis, Department of the Air Force Air University, Air Force Institute of Technology, Wright-Patterson Air Force Base, Ohio, Feb. 2008, 307 pages.

* cited by examiner

AIRSPEED ESTIMATION SYSTEM

This application claims the benefit of PCT Application No. PCT/US15/48503, filed on Sep. 4, 2015, which in turn claims priority to U.S. provisional patent application Ser. No. 62/045,704, filed Sep. 4, 2014. The entire contents of PCT Application No. PCT/US15/48503 and U.S. provisional patent application Ser. No. 62/045,704 are incorporated herein by reference.

BACKGROUND

The present disclosure relates to flight control systems, and more particularly, to aircraft fly-by-wire control systems.

Many vehicles, including helicopters for example, use fly-by-wire (FBW) systems to control flight operation. With these systems, it is possible for the flight control system of a FBW aircraft to provide a variety of tactile cues (such as power cues, level flight cues, control limit cues, etc.) to the pilot. For example, inverse plant with airspeed gain scheduling can be utilized to optimize control laws for different flight regimes such as, for example, low airspeed regimes and high airspeed regimes. In order to maintain aircraft stability, various FBW systems use real-time, i.e., real, airspeed to determine when to change FBW system control laws and gain parameters between high speed and low speed regimes.

Conventional FBW systems establish a default fixed gain value for controlling flight in order to ensure safe transition from high speed to low speed regimes if loss of all measured real airspeed occurs. Another method utilizes global position satellite (GPS) data to estimate airspeed when loss of measured real airspeed occurs. For example, inertial data from an inertial navigation system (INS) is used to update global position satellite (GPS) data for determining position, velocity, and attitude. The position, velocity and attitude determined from the GPS data are in turn utilized to estimate a true airspeed based on the geometric relationship between airspeed, wind speed, and ground speed. Some FBW systems, however, do not provide a definitive default fixed gain value that can be used for high speed to low speed transition. In addition, not all FBW aircraft systems have access to INS or GPS data necessary to estimate airspeed.

BRIEF SUMMARY

According to at least one embodiment, an airspeed estimation system of an aircraft includes an electronic airspeed rate modeler unit configured to output an estimated airspeed rate signal indicating an estimated airspeed rate of the aircraft. The estimated airspeed rate signal is based on a longitudinal body acceleration of the aircraft and at least one adaptive parametric airspeed model. The airspeed estimation system further includes an electronic airspeed estimator unit in signal communication with the airspeed rate modeler unit. The airspeed estimator unit is configured to determine an estimated airspeed of the aircraft based on the estimated airspeed rate signal.

According to another embodiment, a method of estimating airspeed of an aircraft includes outputting an estimated airspeed rate signal via an electronic airspeed rate modeler unit to indicate an estimated airspeed rate of the aircraft. The estimated airspeed rate is based on a longitudinal body acceleration of the aircraft and at least one adaptive parametric airspeed model. The method further includes determining an estimated airspeed of the aircraft via an electronic airspeed estimator unit in response to integrating the estimated airspeed rate signal.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
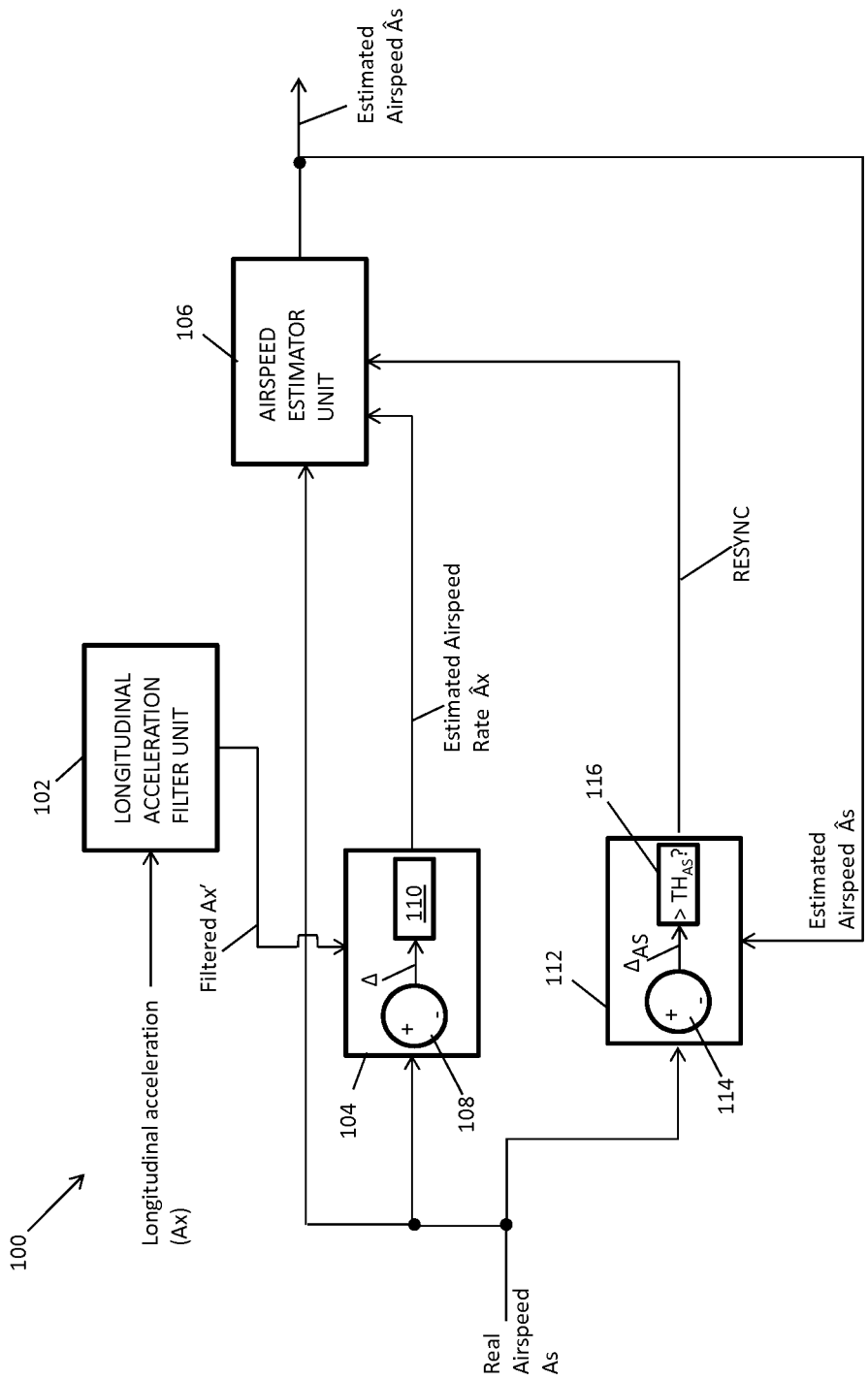
FIG. 1 is a schematic block diagram illustrating an airspeed estimation system according to an embodiment.

It is noted that various connections are set forth between elements in the following description and in the drawings (the contents of which are included in this disclosure by way of reference). It is also noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining airspeed associated with an aircraft, such as a rotorcraft. At least one embodiment determines real airspeed, acceleration and/or attitude using one or more sensors and electronic control units installed on the aircraft as understood by one of ordinary skill in the art. In some embodiments, the airspeed may be synthesized from other known parameters, such as the number of rotor blades and a rotor rotational speed.

Referring now to FIG. 1, an airspeed estimation system 100 is shown according to an exemplary embodiment. The airspeed estimation system 100 is configured to receive one or more dynamic parameters including, but not limited to, real airspeed of the aircraft, longitudinal body acceleration of the aircraft, vertical acceleration of the aircraft, and attitude of the aircraft. An electronic flight control module can determine one or more of the dynamic parameters based on measurements executed by one or more sensors installed on the aircraft as understood by one of ordinary skill in the art.

The airspeed estimation system 100 includes an electronic longitudinal acceleration filter unit 102, an electronic airspeed rate modeler unit 104, and an electronic airspeed estimator unit 106. It is appreciated that each of the electronic longitudinal acceleration filter unit 102, the electronic airspeed rate modeler unit 104, and the airspeed estimator unit 106 are formed as electronic processing circuitry that may include an application specific integrated circuit (ASIC), an electronic circuit, an electronic processor (shared, dedicated, or group) and memory that executes one or more software or firmware programs, a combinational logic circuit, and/or other suitable components that provide the described functionality.

The longitudinal body acceleration (LBA) filter unit 102 receives a longitudinal body acceleration (Ax) signal indicating a longitudinal body acceleration of an aircraft supporting the airspeed estimation system 100. The Ax is defined as the acceleration of the aircraft along a path perpendicular to the attitude of the aircraft as understood by one of ordinary skill in the art. The Ax signal may be output from an electronic flight control module of the aircraft as discussed in detail above. The LBA filter unit 102 is configured to output a filtered Ax signal (Ax') in response to removing (i.e., filtering) various parameters from the Ax signal including, but not limited to, gravity parameters and centrifugal force parameters.

The airspeed rate modeler unit 104 receives the Ax' from the LBA filter unit 102 and also receives a real-time, i.e., real, aircraft speed signal ($A_S$). The $A_S$ signal is output from the flight control module, for example, and indicates the current speed of the aircraft. The airspeed rate modeler unit 104 includes a summer 108 that determines an airspeed differential ($\Delta$) between the Ax' and $A_S$, and applies the airspeed differential ($\Delta$) to one or more adaptive parametric airspeed models 110 stored in memory to determine an estimated airspeed rate ($\hat{A}x$). According to at least one non-limiting embodiment, the parametric model is a model that estimates an output airspeed rate in response to minimizing the difference between the input parameters and the estimated output.

The airspeed estimator unit 106 is configured to monitor the real airspeed ($A_S$) of the aircraft and decide whether to identify the current airspeed of the aircraft using the real airspeed ($A_S$) or an estimated airspeed ($\hat{A}s$) that is determined based on the estimated airspeed rate ($\hat{A}x$). In this manner, the airspeed estimator unit 106 can selectively output a first airspeed signal based on the real airspeed ($A_S$) and a second airspeed signal based on the estimated airspeed ($\hat{A}x$). According to an embodiment, the real airspeed can be used to selectively resynchronize the airspeed estimation system 100 as discussed in greater detail below.

The airspeed estimator unit 106 receives $A_S$ from the main flight control module, for example, and continuously compares $A_S$ to a speed threshold ($TH_{AS}$). When $A_S$ is greater than or equal to $TH_{AS}$, the airspeed estimator unit 106 uses the $A_S$ signal to indicate the current airspeed of the aircraft. In this manner, the airspeed indicated by $A_S$ can be utilized to adjust a first set of gain parameters that are based on both yaw and rudder operation, for example, to control and stabilize the aircraft while the aircraft operates at a first airspeed regime, such as high airspeed. The high airspeed may range, for example, from approximately 300 knots to approximately 60 knots.

When, however, $A_S$ falls below $TH_{AS}$, the airspeed estimator unit 106 disconnects output of the $A_S$ signal and determines an estimated airspeed ($\hat{A}_S$) that is based on the $\hat{A}x$ signal received from the airspeed rate modeler unit 104. That is, when loss of real airspeed data occurs, the airspeed of the aircraft is determined using an estimated airspeed ($\hat{A}_S$) which is based only on changes of the longitudinal body acceleration (Ax) and one or more of the adaptive parametric airspeed models 110. According to an embodiment, the estimated airspeed ($\hat{A}_S$) is calculated as the integral of the estimated airspeed rate ($\hat{A}x$) using, for example, the following equation:

$$\hat{A}s(t) = \int \hat{A}x \, dt$$

In this manner, the airspeed estimator unit 106 can approximate the airspeed of the aircraft if, for example, one or more sensors fail to properly measure the real airspeed of the aircraft and/or the main flight control module fails to properly determine the real airspeed of the aircraft. The airspeed can then be transitioned into a second airspeed regime such as, for example, a low airspeed. The low airspeed may range, for example, between approximately 60 knots and approximately 40 knots. Accordingly, the estimated airspeed $\hat{A}_S$, as opposed to the real airspeed $A_S$, is utilized to adjust a second set of gain parameters based on only yaw operation, for example, to control and stabilize the aircraft while flying at the second airspeed regime (i.e., low airspeed).

The airspeed estimation system 100 further includes an electronic airspeed resynchronization unit 112. Similar to the electronic units described above, the electronic airspeed resynchronization unit 112 can be formed as electronic processing circuitry that may include an application specific integrated circuit (ASIC), an electronic circuit, an electronic processor (shared, dedicated, or group) and memory that executes one or more software or firmware programs, a combinational logic circuit, and/or other suitable components that provide the described functionality. The airspeed resynchronization unit 112 is configured to selectively resynchronize the airspeed estimation system 100 when the estimated airspeed ($\hat{A}_S$) deviates from the real airspeed ($A_S$) as discussed in greater detail below.

The airspeed resynchronization unit 112 includes an error module 114 and a comparator 116. The error module 114 is configured to determine an error value ($\Delta_{AS}$) between the real airspeed ($A_S$) and the estimated airspeed ($\hat{A}_S$). The comparator 116 receives the error value ($\Delta_{AS}$) from the error module 114, and compares $\Delta_{AS}$ to an error threshold ($TH_\Delta$). The error threshold may range from, for example, approximately 15 knots to approximately 20 knots. When $\Delta_{AS}$ exceeds $TH_\Delta$, the airspeed resynchronization unit 112 outputs a resynchronization signal (RESYNC) such that the estimated airspeed ($\hat{A}_S$) is resynchronized with respect to the real airspeed ($A_S$). According to an embodiment, $\hat{A}s$ is resynchronized by regenerating $\hat{A}x$ using a differential between Ax and $A_S$, and one or more of the adaptive parametric airspeed models 110 as described in detail above.

Figure 2:
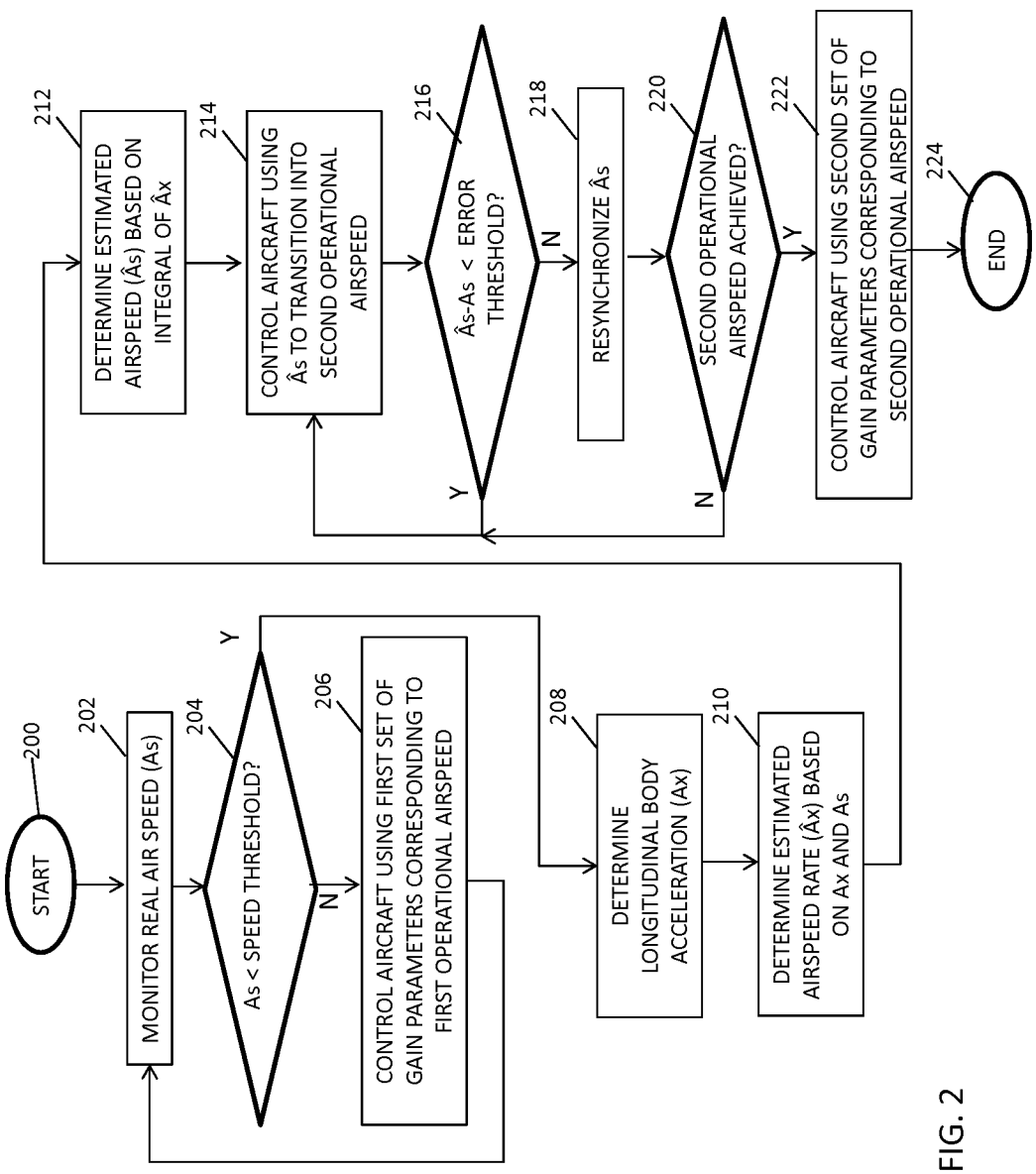
FIG. 2 is a flow diagram illustrating a method of estimating airspeed according to an exemplary embodiment.

Turning now to FIG. 2, a flow diagram illustrates a method of estimating airspeed according to an exemplary embodiment. The method begins at operation 200, and at operation 202 the real airspeed ($A_S$) of the aircraft is monitored. At operation 204, $A_S$ is compared to a speed threshold. When $A_S$ is greater than or equal to the speed threshold, the aircraft is controlled using a first set of gain parameters corresponding to a first airspeed regime such as, for example, a high airspeed, at operation 206 and the method returns to operation 202 to continue monitoring $A_S$. When, however, $A_S$ is below the speed threshold, the longitudinal body acceleration (Ax) of the aircraft is determined at operation 208. At operation 210, an estimated airspeed rate ($\hat{A}x$) based on Ax and $A_S$ is determined. According to an embodiment, Ax is filtered to obtain a filtered longitudinal body acceleration Ax', and $\hat{A}x$ is determined using a differential between Ax' and $A_S$, in conjunction with one or more adaptive parametric airspeed models. At operation 212, an estimated airspeed ($\hat{A}_S$) is determined based on $\hat{A}x$. According to an embodiment, $\hat{A}_S$ is determined based on an integration of $\hat{A}x$.

The aircraft is controlled using $\hat{A}s$ to transition into a second airspeed regime such as, for example, a low airspeed, at operation 214. An error value between $\hat{A}_S$ and $A_S$ is compared to an error threshold at operation 216. The error value can be determined based on a difference between $\hat{A}_S$ and $A_S$. When the error value is below the error threshold, for example, aircraft control using $\hat{A}s$ is maintained at operation 214. When, however, the error value exceeds the error threshold, $\hat{A}_S$ is resynchronized at operation 218. According to an embodiment, $\hat{A}s$ is resynchronized by regenerating $\hat{A}x$ using a differential between Ax and $A_S$, and one or more of the adaptive parametric airspeed models as described above. At operation 220, a determination is made as to whether the second operational airspeed (e.g., the low airspeed) is achieved. When the second operational airspeed is not achieved, the method returns to operation 214 and aircraft control continues based on $\hat{A}_S$ (e.g., the resynchronized $\hat{A}_S$). When, however, the second operational airspeed is achieved, the aircraft is controlled using a second set of gain parameters (e.g., a different set of gain parameters from the first set of gain parameters used at operation 206) corresponding to the second airspeed regime (e.g., the low airspeed) at operation 222, and the method ends at operation 224.

Various non-limiting embodiments described above provide one or more technical effects including, for example, outputting an estimated airspeed rate signal via an electronic airspeed rate modeler unit to indicate an estimated airspeed rate of the aircraft. Another technical effect achieved by one or more non-limiting embodiments described above provides a short term estimated airspeed for transition from high speed to low speed regime as mitigation for loss of airspeed data, including a loss of all airspeed data. Another technical effect achieved by at least one non-limiting embodiment of the invention includes a requisite of only valid longitudinal acceleration such that neither inertial navigation system (INS) data nor GPS data is needed to estimate the airspeed. Yet, another technical effect provided by one or more non-limiting embodiments described above allows for estimating airspeed using adaptive (i.e., dynamic) parametric models, which dynamically adjust estimated airspeed data based on the difference between valid airspeed data and estimated airspeed data. Further technical effects provided by at least one non-limiting embodiment of the invention allows for synchronizing estimated airspeed with valid airspeed such that estimated airspeed and airspeed remain close thereby providing the parametric models with the most current values.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Various non-limiting embodiments of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. An airspeed estimation system of an aircraft, comprising:
    a non-transitory memory having computer readable instructions;
    a processor configured to execute the computer readable instructions;
    an electronic airspeed rate modeler unit coupled to the processor, the electronic airspeed rate modeler unit configured to output an estimated airspeed rate signal indicating an estimated airspeed rate of the aircraft based on a longitudinal body acceleration of the aircraft and at least one adaptive parametric airspeed model; and
    an electronic airspeed estimator unit coupled to the processor and in signal communication with the airspeed rate modeler unit, the airspeed estimator unit configured to:
        determine an estimated airspeed of the aircraft based on the estimated airspeed rate signal;
        monitor a real airspeed of the aircraft, and selectively output a first airspeed signal based on the real airspeed and a second airspeed signal based on the estimated airspeed;
        wherein the first airspeed signal is output in response to the real airspeed being at least equal to the speed threshold and the second airspeed signal is output in response to the real airspeed being less than the speed threshold; and
    wherein a flight control system is operable to control flight operations of the aircraft using the first airspeed signal or the second airspeed signal.

2. The airspeed estimation system of claim 1, wherein the airspeed estimator unit determines the estimated airspeed in response to integrating the estimated airspeed rate.

3. The airspeed estimation system of claim 1, further comprising a longitudinal body acceleration filter unit that receives a longitudinal body acceleration signal indicating the longitudinal body acceleration and outputs a filtered longitudinal body acceleration signal in response to removing at least one of gravity parameters and centrifugal force parameters from the longitudinal body acceleration signal.

4. The airspeed estimation system of claim 3, wherein the electronic airspeed rate modeler unit further comprises a summer that determines an airspeed differential value between the filtered longitudinal body acceleration signal and the real airspeed, and applies the airspeed differential value to at least one adaptive parametric airspeed model to determine the estimated airspeed rate.

5. The airspeed estimation system of claim 4, further comprising an electronic airspeed resynchronization unit that determines an error value between the estimated airspeed and the real airspeed, and resynchronizes the estimated airspeed with respect to the real airspeed based on a comparison between the error value and an error threshold value.

6. The airspeed estimation system of claim 5, wherein the electronic airspeed resynchronization unit resynchronizes the estimated airspeed in response to the error value exceeding the error threshold value.

7. A method of estimating airspeed of an aircraft, the method comprising:
    outputting an estimated airspeed rate signal via an electronic airspeed rate modeler unit to indicate an estimated airspeed rate of the aircraft based on a longitudinal body acceleration of the aircraft and at least one adaptive parametric airspeed model;

determining an estimated airspeed of the aircraft via an electronic airspeed estimator unit in response to integrating the estimated airspeed rate signal; and monitoring, by the electronic airspeed estimator unit, a real airspeed of the aircraft, and selectively outputting a first airspeed signal based on the real airspeed and a second airspeed signal based on the estimated airspeed;

wherein the first airspeed signal is output in response to the real airspeed being at least equal to the speed threshold and the second airspeed signal is output in response to the real airspeed being less than the speed threshold; and wherein a flight control system controls flight operations of the aircraft using the first airspeed signal or the second airspeed signal.

8. The method of claim 7, further comprising measuring the longitudinal body acceleration of the aircraft and outputting a filtered longitudinal body acceleration signal in response to removing at least one of gravity parameters and centrifugal force parameters from the longitudinal body acceleration signal.

9. The method of claim 8, further comprising determining an airspeed differential value between the filtered longitudinal body acceleration signal and the real airspeed, and determining the estimated airspeed rate in response to applying the airspeed differential value to at least one adaptive parametric airspeed model.

10. The method of claim 7, further comprising determining an error value between the estimated airspeed and the real airspeed, and resynchronizing the estimated airspeed with respect to the real airspeed in response to the error value exceeding an error threshold value.

* * * * *